United States Patent
Scharf et al.

(10) Patent No.: US 8,636,237 B2
(45) Date of Patent: Jan. 28, 2014

(54) HERB GRINDER

(75) Inventors: Eitam Scharf, Arad (IL); Kimberly Dian Grant, Los Angeles, CA (US)

(73) Assignee: The Violina Syndicate, LLC, Los Angeles, CA (US)

( * ) Notice: Subject to any disclaimer, the term of this patent is extended or adjusted under 35 U.S.C. 154(b) by 157 days.

(21) Appl. No.: 13/010,763

(22) Filed: Jan. 20, 2011

(65) Prior Publication Data

US 2012/0187231 A1   Jul. 26, 2012

(51) Int. Cl.
*B02C 17/02*   (2006.01)
*B02C 13/00*   (2006.01)

(52) U.S. Cl.
USPC .......................................... 241/95; 241/273.1

(58) Field of Classification Search
USPC ................. 241/95, 168, 273.1–273.4
See application file for complete search history.

(56) References Cited

U.S. PATENT DOCUMENTS

| | | | |
|---|---|---|---|
| 117,924 A * | 8/1871 | Peirce ........................ | 241/273.1 |
| 268,511 A * | 12/1882 | McCobb ...................... | 241/100 |
| 337,619 A * | 3/1886 | Salmon ...................... | 241/168 |
| 933,507 A * | 9/1909 | Weber ........................ | 241/273.1 |
| 1,410,008 A * | 3/1922 | Gale et al. ...................... | 241/95 |
| 1,845,522 A | 2/1932 | Rowley | |
| 1,915,869 A | 6/1933 | Rowley | |
| 2,110,799 A | 3/1938 | Henschell | |
| 2,225,658 A | 12/1940 | Franz | |
| 2,252,859 A * | 8/1941 | Murdock ...................... | 241/95 |
| 2,405,056 A * | 7/1946 | Rosenbloom ................ | 241/273.1 |
| 2,500,560 A | 3/1950 | Morris | |
| D167,270 S | 7/1952 | Marcus | |
| 3,045,321 A | 7/1962 | McDermott | |
| 3,121,450 A * | 2/1964 | Cronheim ................ | 241/101.01 |
| 3,604,490 A | 9/1971 | Bricker | |
| 3,858,815 A * | 1/1975 | Black ........................... | 241/168 |
| 4,037,793 A | 7/1977 | Puustinin | |
| 4,240,806 A | 12/1980 | Frantzen | |

(Continued)

FOREIGN PATENT DOCUMENTS

KR   2019950029440   11/1995
KR   1020060046519   5/2006

OTHER PUBLICATIONS

What Makes a Microplane Tool Sharp from the Web site printout of Jan. 19, 2011 at http://us.microplane.com/whymicroplanetoolsworkbetter.aspx (1 page).

(Continued)

*Primary Examiner* — Faye Francis
(74) *Attorney, Agent, or Firm* — Fulwider Patton LLP

(57) ABSTRACT

A herb grinder includes a metal sheet having a first surface and an opposite second surface. the sheet being configured to include, on at least one of the surfaces, a plurality of grooves extending parallel with one another and spaced apart from one another, wherein the grooves and said at least one of the surfaces, a plurality of grooves extending parallel with one another and spaced apart from one another, wherein the grooves and at least one of the surfaces define a square wave shape having flat valleys and flat peaks, wherein the flat valleys are roughened by a process of photochemical etching. A plurality of holes of a first type, extending from a peak to the bottom surface of the metal sheet, and a plurality of holes of a second type extending from a valley to the bottom surface of the metal sheet.

8 Claims, 4 Drawing Sheets

(56) References Cited

U.S. PATENT DOCUMENTS

| | | |
|---|---|---|
| 4,272,612 A | 6/1981 | Oliver |
| 4,790,488 A * | 12/1988 | Borner ............................ 241/95 |
| 5,100,506 A | 3/1992 | Sturtevant et al. |
| D347,979 S | 6/1994 | Deer et al. |
| 5,711,491 A | 1/1998 | Molo |
| 6,082,645 A | 7/2000 | Himmighofen |
| D447,022 S | 8/2001 | Wong |
| D447,391 S | 9/2001 | Bodum |
| 6,318,652 B1 | 11/2001 | Liu |
| 6,467,709 B1 * | 10/2002 | Hattori ............................ 241/30 |
| D474,378 S | 5/2003 | Brandenburg |
| D480,613 S | 10/2003 | Wong |
| 6,860,441 B2 | 3/2005 | Richardson |
| 6,883,697 B1 | 4/2005 | Chi Kuo |
| 8,381,640 B1 | 2/2013 | Wilson |
| 2003/0222162 A1 | 12/2003 | Klamer |
| 2007/0193662 A1 | 8/2007 | Jablokov |
| 2007/0251100 A1 | 11/2007 | Fisk |
| 2010/0242745 A1 | 9/2010 | Smith |
| 2011/0017853 A1 | 1/2011 | Smith |

OTHER PUBLICATIONS

PCT/US2011/063329; PCT International Search Report and Written Opinion; dated Aug. 27, 2012.

* cited by examiner

HERB GRINDER

BACKGROUND

The present invention relates to an abrading device and method of making the same. Specifically, the invention relates to an abrading device for grinding a herb or similar plant or food related substance to a fine mulch or small particulate form suitable for ingestion and other uses.

Grinders for rendering foods and spices to mulch or particulate form are known in the art. However, a problem found in the art is that a food grinder is typically a large home or industrial scale device suitable for grinding large volumes of food or herbs. Such food grinders may typically be driven by a motor that may cause an excessive amount of heat energy to be transferred to the herb, and has the risk of heating and spoiling the herb. Yet, certain herbs are required in only small quantities at a time for specific consumption. In these cases, in order to preserve the herb's freshness, it is preferable to keep the herb stock hermetically sealed in its natural form for as long as possible before grinding only a very small portion of the herb stock to a fine mulch or particulate form suitable for use. Moreover, some herbs require very delicate handling when being ground to mulch or particulate form because they may be damaged if overheated or may suffer destruction of natural oil structures if ground too aggressively or energetically. Where manual grinders are used in the prior art, a problem encountered in this field is that the surface of the grinder that is exposed for use is typically rough or sharp. Thus, a user who manually grinds a product on such a surface tends to find that toward the end of a grinding operation, when much of the product has been ground away, his fingers are exposed to the surface of the grinder and as a result he may injure or scrape the tips of his fingers.

Therefore, there is a need in the art for a herb grinder that allows a user to reduce a delicate natural herb to a small quantity of ground mulch or particulates by applying a minimal amount of energy to the herb during grinding, so that overheating and destruction of oils do not result. There is a further need for a portable manual herb grinder that is easy to carry and that reduces the tendency of the grinder to injure a user in the final stages of a grinding operation. The present invention addresses these and other needs.

SUMMARY OF THE INVENTION

The present invention is a herb grinder configured for delicate grinding of herbs and similar plant or food related products. In a preferred embodiment of the invention, the herb grinder comprises a metal sheet having a first surface and second surface opposite the first surface. The sheet is configured to include, on the first surface, a plurality of grooves or channels. The grooves extend parallel with one another, are spaced apart from one another, and have a depth of between 0.025 mm and 0.2 mm. As a result of the described configuration, the grooves and the first surface define, in cross section, a square wave shape having valleys and peaks. Each valley has a planar floor that is roughened to provide a finely abrasive surface, and each peak has a planar cap that is not roughened. In one aspect of the invention, the valleys are roughened to have an abrasive surface by the process of photochemical etching, which has the inherent result of leaving a metal surface with a crystalline structure in places where it has been chemically etched. The herb grinder further include a plurality of holes of a first type, the first type of hole extending from a peak to the second surface of the metal sheet. The herb grinder also includes a plurality of holes of a second type, the second type of hole extending from a valley to the second surface of the metal sheet.

In a further preferred aspect of the invention, the metal sheet is between 0.2 mm and 1.0 mm thick.

Further preferred, the grooves are between 0.6 mm and 5.0 mm wide, and the centers of the grooves are spaced apart between 1.2 mm and 10.0 mm.

In another facet, the invention includes a method of making a herb grinder comprising the steps of etching into a sheet of metal, by photochemical process, a series of parallel and spaced apart linear grooves having valley surfaces, whereby the valley surfaces once etched have a rough metal crystalline surface capable of abrading organic matter. A further step includes etching, by photochemical process, a plurality of holes of a first type into the valley surfaces so that each first type hole extends entirely through the sheet of metal. And yet a further step includes etching, by photochemical process, a plurality of holes of a second type into spaces on the metal sheet between the grooves so that each second type hole extends entirely through the sheet of metal. In a preferred aspect of the invention, etching the holes precedes etching the grooves. However, if desired, the grooves can be etched prior to etching the holes.

The herb grinder of the present invention, possessing the structure and method described, has the advantage of being shaped to provide a two step process for grinding herbs into a mulch or particulate form. The two step process includes a micro-abrasion action, and a macro-abrasion action. When a sprig of herb is dragged perpendicularly across the grooves, the herb is first abraded on the crystalline surface of the grooves to produce a fine mulch or particulate form. Then, when the herb reaches the side wall of the groove, the sprig of herb is knocked on the side wall which tends to dislodge the herb from the sprig. The dislodged herb falls down through one of the holes where it may be collected on a flat surface beneath the herb grinder.

These and other advantages of the invention will become more apparent from the following detailed description thereof and the accompanying exemplary drawings.

DETAILED DESCRIPTION OF THE PREFERRED EMBODIMENTS

Figure 1A:
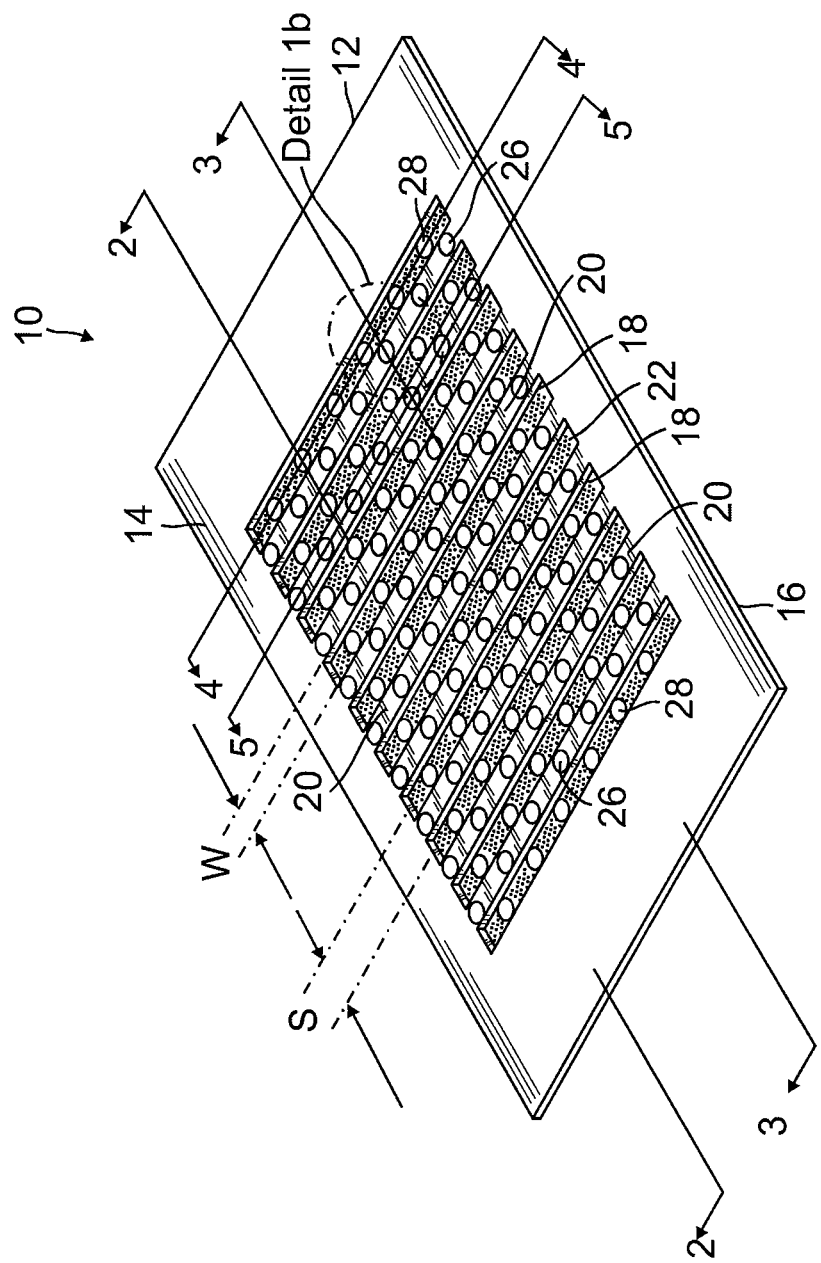
FIG. 1a is a perspective view of a herb grinder having features of the present invention.

Referring now to the drawings, there is shown a herb grinder 10 that includes features of the present invention. The structure of the preferred embodiment will be first described, followed by preferred methods of manufacturing the same.

In a first aspect of the novel herb grinder 10, and with reference to FIG. 1, the present invention comprises a thin metal sheet 12, preferably formed from stainless steel, and preferably between 0.2 mm and 1.0 mm thick having a top surface 14 and a bottom surface 16. Preferably, the sides of the sheet 12 are about 4 mm to 6 mm on one side, and 8 mm to 10 mm on the other side, approximately the size of a typical credit card.

In a second aspect of the invention, the sheet 12 has a series of similarly shaped parallel linear grooves 18 formed at least in the top surface 14 of the sheet. The size and shape of the grooves can vary, and are selected with the primary preferred objective that a user's finger, drawn across the upper surface 14 of the grinder, will not penetrate a groove to reach the floor of a groove 18. Thus, preferably, the grooves 18 have a width "w" which is one half the dimension of the center spacing "s" between the grooves. In a preferred embodiment the width "w" of the grooves is between 0.6 mm and 5.0 mm, and the center spacing "s" of the grooves is between 1.2 mm and 10.0 mm. The depth "d" of the grooves is preferably between 0.025 mm and 0.2 mm deep.

Figure 1B:
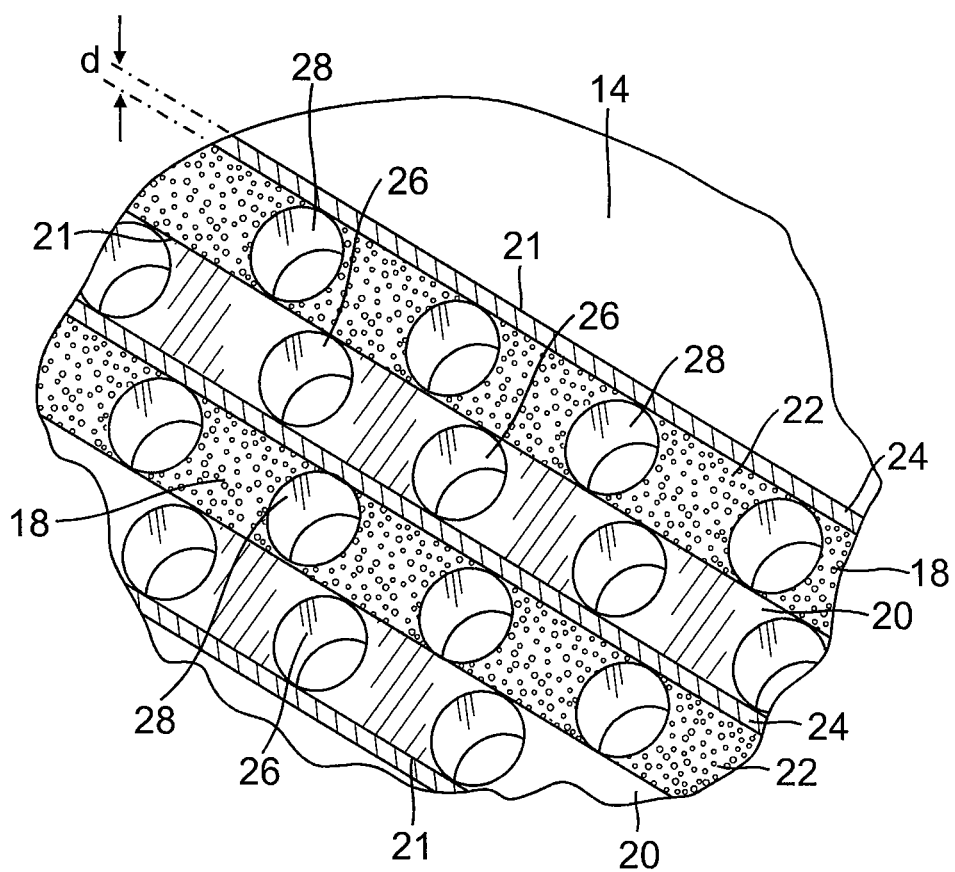
FIG. 1b is a detail view of a portion of FIG. 1a that is identified therein as "Detail 1b."
Figure 2:
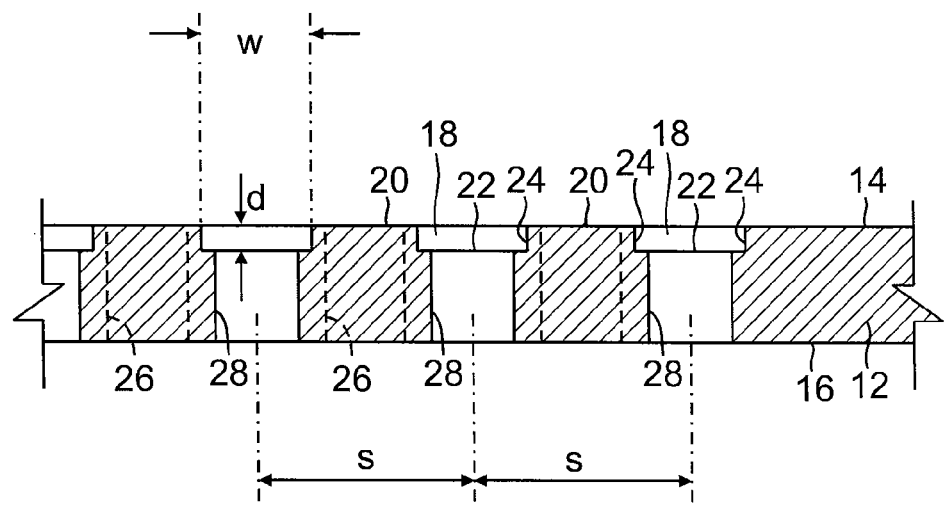
FIG. 2 is sectional view of the herb grinder of FIG. 1 taken substantially through line 2-2 in FIG. 1.
Figure 3:
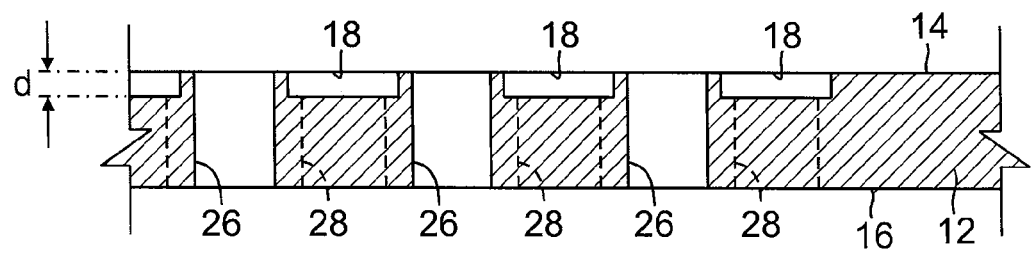
FIG. 3 is sectional view of the herb grinder of FIG. 1 taken substantially through line 3-3 in FIG. 1.
Figure 4:
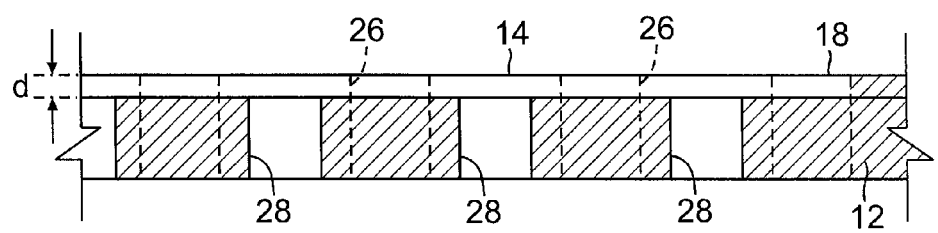
FIG. 4 is a sectional view of the herb grinder of FIG. 1 taken substantially through line 4-4 in FIG. 1.
Figure 5:
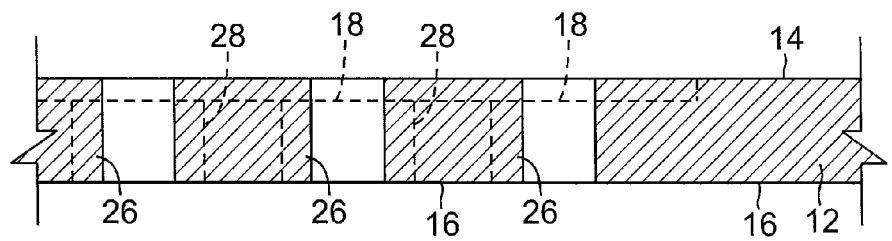
FIG. 5 is a sectional view of the herb grinder of FIG. 1 taken substantially through line 5-5 in FIG. 1.

In accordance with the structure described, four sectional views are shown and described in FIGS. 2-5. A first sectional view taken through the sheet and extending perpendicular to the grooves substantially along line 2-2 of FIG. 1 is shown in FIG. 2, which shows in cross section a series of horizontal steps in the form of a square wave extending along the upper surface of the sheet. Each wave's wavelength "s" has an upper surface 20 facing upwards, which may also referred to herein as a peak or cap. In a preferred embodiment, the upper surface may be formed, effectively, by the unaltered top surface 14 of the sheet 12. Each wave also has a lower surface 22 facing upwards that is lower than the upper surface 20. The lower surface may also be referred to herein as a valley or valley floor. Each upper surface 20 of a wave is connected to each lower surface 22 by a vertical surface, or wall, 24 present in each groove 18, so that the wave is in effect a continuous square wave shaped surface formed on the sheet, as exemplified in FIGS. 2-3.

In a third aspect of the herb grinder 10, the invention includes a plurality of holes extending through the sheet 12. Preferably, the holes are circular in profile, but may be square, diamond, elliptical, star, pentagon, or triangular and the like in alternative embodiments. All the holes preferably have the same diameter or size and include two types of hole as described below.

A plurality of a first type of hole, each shown marked with the numeral 26, are formed in the sheet so that each first type hole 26 is spaced laterally apart from an adjacent first type hole along the length of an upper surface 20 of a wave as exemplified in FIG. 1a. Each first type hole 26 extends from the upper surface 20 of the wave to the bottom surface 16 of the sheet, as seen in FIGS. 2-5. The size of and spacing between the holes can vary, depending on the desired particulate size of the ground herb. Preferably, the holes of the first type 26 are spaced apart from each other by a distance of between 1.5 mm and 2.5 mm. Further, the diameter of each hole of the first type is preferably sized to fit comfortably within the space created on the upper surface 20, as seen in FIG. 1a. Preferably, the holes have a diameter of between 0.6 mm and 5.0 mm, with a typical size of about 1.8 mm. A larger hole can be used when a more chunky ground herb is desired. A smaller hole can be used to produce a finer ground herb.

A set of holes of a second type, marked generally with the numeral 28, is formed in the sheet so that each hole of the second type 28 is spaced apart from an adjacent second type hole, and each second type hole is positioned along the length of a lower surface 22 of the wave within a groove 18 and extends from the lower surface 22 of the wave to the bottom surface 16 of the sheet, as seen in FIGS. 2-5. Under this configuration, a plurality of lower surfaces 22 may include second type holes 26. The size of and spacing between the holes can vary, as desired. Preferably, the holes of the second type are spaced apart from each other by a distance of between 1.5 mm and 2.5 mm. Further, the diameter or size of each hole of the second type is preferably sized to fit precisely within the width "w" of the lower surface 22, as seen in FIG. 1a.

All of the holes of the first and second type can be made the same size for uniform grinding. Alternatively, holes of different sizes can be used in different regions to produce different grinding surfaces in different areas of the grinder.

The structural shape thus described as being formed in the metallic sheet 10 is preferably manufactured using the process of photochemical etching. It is known that photochemical etching is capable of very precise shaping of metallic workpieces, and this method is used in practicing the present invention for shaping from a blank metal sheet 12 the herb grinder of the present invention. Aspects of the now well known process of photochemical etching are described in U.S. Pat. No. 4,272,612, and U.S. Pat. No. 4,237,209 which are incorporated herein by reference.

As a result of the process of photochemical etching used to form the wave pattern (in cross section) comprising the grooves 18 and holes 26, 28 in the metallic sheet 12, it will be seen that each upward facing lower surface 22 of the wave pattern is formed directly by chemical erosion or etching. Thus, as an inherent result of the chemical erosion process, the upward facing lower surface 22 (i.e. the floor of each groove 18) is given a rough crystalline surface texture that is found to form from stainless steel during chemical erosion. Such a crystalline surface provides a suitable abrasive surface for gently abrading a herb or other organic matter as described more fully below. As a further inherent result of the chemical erosion process, the edges 21 (See FIG. 1b) of the upper surfaces 20 at the point of intersection between the upper surface 20 and the vertical wall 24, and the edges of the holes 26 and 28, are somewhat rounded, and do not present a sharp edge capable of injuring the tips of a user's fingers, such as might be the case if the grooves were mechanically cut into the metal sheet 10. Furthermore, in a preferred embodiment, the upper surface 20 of each square wave is not chemically etched, thus leaving the upper surface 20 of each square wave in its original smooth configuration as part of the upper surface 14 of the original metal sheet. This preferred aspect imparts the advantage that the abrasive surfaces 18 on the floor of each groove are set below the upper surface 14 of the grinder. Thus, a user who inadvertently allows his fingers to pass rapidly over the grinder does not abrade or injure the tips of his fingers because the size, depth, and spacing of the grooves are selected such that a finger passing rapidly over the upper surface 14 of the grinder will not pass through a groove to reach the abrasive bottom surface 18 of the groove, and the upper surface 20 is without an abrasive surface. This feature, and the credit card size of the preferred embodiment, also makes the grinder easy to carry in a pocket or a wallet or a similar type of small flat case used for carrying personal items.

The foregoing describes structural features included in the herb grinder 10 of the present invention. This structure provides advantageous features for grinding a herb to a fine mulch or particulate form without requiring or imparting excessive energy or heating. A herb is ground by rubbing a dried sprig of herb along the sheet 12, perpendicular to the direction of the grooves 18 so that the sprig is dragged across a plurality of grooves. The depth of the grooves is selected so that, as the sprig passes over each groove, a portion of the sprig is biased by the user to enter into the groove to be dragged over the crystalline lower surface 22 of each groove 18. Passing the sprig over the crystalline lower surface 22 produces a first micro-abrasive action which pulverizes the tip of the sprig in contact with the crystalline surface. Then, when the sprig has passed over the lower surface 22, it is knocked into one of the vertical walls 24 of the groove 18. This knocking effect produces a second, macro-abrasive, action which does not necessarily cut the sprig, but knocks off any ground herb that has been formed and attached to the tip of the sprig. Ultimately, after the ground herb has been knocked off the sprig, the ground herb falls through either a first type hole 26 or a second type hole 28 onto a paper or collection sheet situated under the grinder that is suitable for collecting the herb without tainting or affecting its qualities. Any large or undesired stems or seeds that break off during grinding are separated from the mulch and remain on the upper surfaces of the grinder where they can be brushed away. Furthermore, as noted above, the preferred configuration of the grinder is such that a user who inadvertently allows his fingers to pass over the upper surface 14 of the grinder will likely not suffer injury to his fingers because the abrasive surface of the grinder is located at the bottom of the grooves where a finger is too large to penetrate, and the upper edges of the grooves and holes are sufficiently rounded by the etching process to avoid injury.

Thus, the dual abrasive structure provides an advantageous structure for finely grinding delicate herbs and collecting the powdered proceeds without overheating or degrading the herb. The present invention may, of course, be carried out in other specific ways than those herein set forth without departing from the essential characteristics of the invention. The present embodiments are, therefore, to be considered in all respects as illustrative and not restrictive, while the scope of the invention is set forth in the claims that follow.

We claim:

1. A herb grinder comprising:
   a metal sheet having a first surface and second surface opposite the first surface, the sheet being configured to include, on the first surface, a plurality of grooves, each groove extending parallel with one another and spaced apart from one another, wherein the grooves and the first surface define, in cross section, a square wave shape having valleys and peaks, wherein each valley has a planar floor that is roughened to provide a finely abrasive surface, and each peak has a planar cap that is not roughened;
   a plurality of holes of a first type, the first type of hole extending from a peak to the second surface of the metal sheet;
   a plurality of holes of a second type, the second type of hole extending from a valley to the second surface of the metal sheet.

2. The herb grinder of claim 1, wherein the valleys are roughened by a process of photochemical etching.

3. The herb grinder of claim 1, wherein the metal sheet is between 0.2 mm and 2.0 mm thick.

4. The herb grinder of claim 1, wherein the grooves are between 0.6 mm and 5.0 mm wide.

5. The herb grinder of claim 1, wherein the grooves are between 0.025 mm and 0.2 mm deep.

6. The herb grinder of claim 1, wherein the centers of the grooves are spaced apart between 1.2 mm and 10.0 mm.

7. The herb grinder of claim 1, wherein the holes are shaped to be at least one of circular, square, diamond, elliptical, star, pentagon, or triangular.

8. The herb grinder of claim 1, wherein the metal sheet is sized along its edges to be approximately the size of a credit card.

* * * * *